(12) United States Patent
Deville et al.

(10) Patent No.: US 10,945,820 B2
(45) Date of Patent: Mar. 16, 2021

(54) PRODUCTION OF A DENTAL PROSTHESIS

(71) Applicant: LYRA HOLDING, Saint-Gilles (BE)

(72) Inventors: Charles Louis Marie Deville, Asnieres sur Seine (FR); Cédric Lancieux, Cordon (FR); Cédric Gilbert Allene, Liverdy-en-Brie (FR)

(73) Assignee: LYRA HOLDING, Saint-Gilles (BE)

( * ) Notice: Subject to any disclaimer, the term of this patent is extended or adjusted under 35 U.S.C. 154(b) by 291 days.

(21) Appl. No.: 15/557,270

(22) PCT Filed: Mar. 7, 2016

(86) PCT No.: PCT/EP2016/054755
§ 371 (c)(1),
(2) Date: Oct. 6, 2017

(87) PCT Pub. No.: WO2016/142325
PCT Pub. Date: Sep. 15, 2016

(65) Prior Publication Data
US 2018/0200034 A1 Jul. 19, 2018

(30) Foreign Application Priority Data
Mar. 9, 2015 (FR) ...................................... 1551959

(51) Int. Cl.
*A61C 13/00* (2006.01)
*A61C 8/00* (2006.01)
(Continued)

(52) U.S. Cl.
CPC ............ *A61C 13/0004* (2013.01); *A61C 5/77* (2017.02); *A61C 8/005* (2013.01); *A61C 8/0051* (2013.01);
(Continued)

(58) Field of Classification Search
CPC ............ A61C 13/0004; A61C 13/0018; A61C 13/0019; A61C 13/083; A61C 13/0006;
(Continued)

(56) References Cited

U.S. PATENT DOCUMENTS

| 2012/0177456 A1* | 7/2012 | Jung ................. A61C 13/0004 408/1 R |
| 2012/0219930 A1 | 8/2012 | Heinz et al. |

(Continued)

FOREIGN PATENT DOCUMENTS

| EP | 2 324 795 A1 | 5/2011 | |
| EP | 2 444 028 A1 | 4/2012 | |
| EP | 2444028 A1 * | 4/2012 | ............. A61C 8/005 |

OTHER PUBLICATIONS

International Search Report and Written Opinion dated May 18, 2016 issued in corresponding application No. PCT/EP2016/054755; w/ English partial translation and partial machine translation (25 pages).

*Primary Examiner* — Bayan Salone
(74) *Attorney, Agent, or Firm* — Westerman, Hattori, Daniels & Adrian, LLP (57) ABSTRACT

Method for manufacturing a dental prosthesis on implant, characterized in that it comprises a step of manufacturing of the outer wall (E5) of the dental prosthesis and a step of manufacturing of at least one connection (E6) intended for fixing on to at least one implant.

21 Claims, 9 Drawing Sheets

(51) Int. Cl.
*A61C 5/77* (2017.01)
*A61C 9/00* (2006.01)
*A61C 13/08* (2006.01)
*A61C 13/083* (2006.01)

(52) U.S. Cl.
CPC .......... *A61C 9/004* (2013.01); *A61C 13/0006* (2013.01); *A61C 13/0018* (2013.01); *A61C 13/0019* (2013.01); *A61C 13/0022* (2013.01); *A61C 13/083* (2013.01); *A61C 8/0048* (2013.01); *A61C 8/0066* (2013.01)

(58) Field of Classification Search
CPC ..... A61C 13/0022; A61C 8/0051; A61C 5/77; A61C 9/004; A61C 8/0048; A61C 8/005; A61C 8/0066
See application file for complete search history.

(56) References Cited

U.S. PATENT DOCUMENTS

| | | | | |
|---|---|---|---|---|
| 2012/0270179 A1* | 10/2012 | Holmstrom | .......... | A61C 9/0053 |
| | | | | 433/173 |
| 2012/0296613 A1* | 11/2012 | Kirchner | ............ | A61C 13/0004 |
| | | | | 703/1 |
| 2014/0011155 A1* | 1/2014 | Thomsen | ............ | A61B 5/0062 |
| | | | | 433/29 |

\* cited by examiner

PRODUCTION OF A DENTAL PROSTHESIS

TECHNICAL FIELD OF THE INVENTION

The invention relates to a method for manufacturing a dental prosthesis on implant. It relates also to a device implementing this method.

STATE OF THE ART

When a dentition has to be reconstructed, one prior art method relies on the use of at least one dental implant directly fixed into the bone framework, on to which a dental prosthesis is fixed, via an implant abutment.

The prior art solutions often involve manual steps in the manufacturing of a dental prosthesis.

Figure 1:
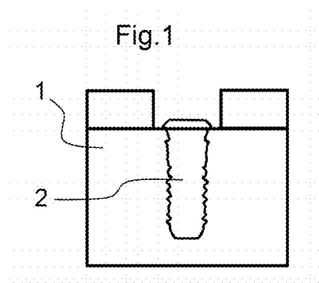
FIGS. 1 to 5 represent steps of a dental reconstruction method according to a prior art.
Figure 2:
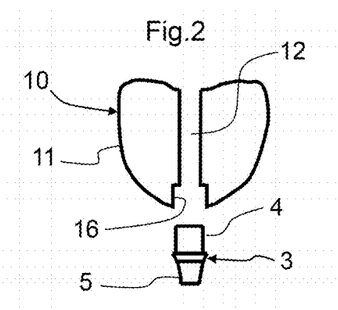
Figure 3:
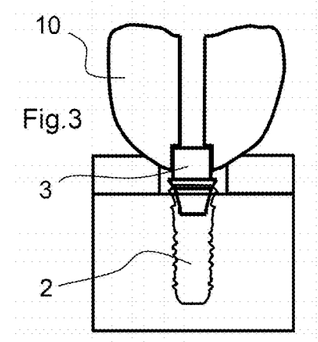
Figure 4:
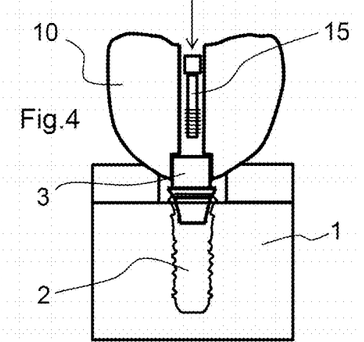
Figure 5:
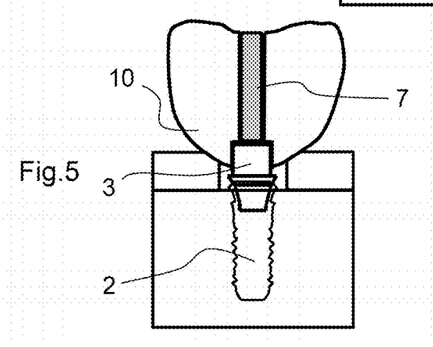

FIGS. 1 to 5 illustrate a prior art method making it possible to replace a tooth. FIG. 1 represents the jaw 1 in the zone where the tooth is missing, in which an implant 2 has been fixed in the conventional way. FIG. 2 represents a dental prosthesis 10, intended to replace the missing tooth, which comprises a peripheral surface 11 best imitating the form of a real tooth and defined as a function of the form of the free space originating from the adjacent teeth. The dental prosthesis 10 is also pierced by a through opening 12, forming, in its lower part, a connection 16. Note that this connection 16 is not detailed in order to simplify the representation, but in practice it comprises a complex form. The dental prosthesis 10 is associated with a abutment 3, which comprises a first part 4 intended for cooperation with the connection 16 of the dental prosthesis 10, and a second part 5 intended to cooperate with the outer end 6 of the implant 2. This connection of the dental prosthesis 10 on to the abutment 3 is locked by bonding. FIG. 3 represents the assembly of the dental prosthesis 10 on the implant 2, via the abutment 3. This assembly is then secured by a screw 15, inserted into the opening 12 of the prosthesis to be screwed on to the implant 2, through the abutment 3 on to which the screw head comes into abutment, as illustrated by FIG. 4. When this operation is finished, the opening 12 of the dental prosthesis 10 is plugged by a suitable material 7. Note that the abutment 3 therefore represents an intermediate piece between the dental prosthesis and the implant. A particular feature of a prosthesis on implant compared to a non-implant prosthesis stems from the fact that the prosthesis on implant comprises a connection of very small size in the lower part, to cooperate with a abutment, generally inscribed within a cylinder with a diameter of the order of 3 mm.

Figure 6:
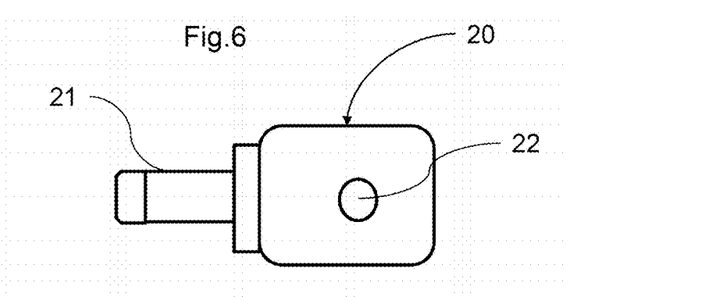
FIG. 6 represents a preformed block used as the basis for a dentist for the machining of a dental prosthesis according to a prior art.

In practice, the outer surface 11 of the dental prosthesis 10 is sometimes machined by the dentist during the reconstruction operation, from a substantially parallelepipedal block 20, represented in FIG. 6, comprising a through opening 22 corresponding to the future through opening 12 of the dental prosthesis. This block 20 thus incorporates the connection 16 of the future crown. Finally, the block 20 is fixed to a gripping member 21 whose connection is adapted for fixing on to a machining machine, which holds the block 20 by this gripping member 21 while the outer surface 11 thereof is machined.

The drawback of this prior art solution described above stems from the fact that it is necessary to first manufacture the abovementioned blocks 20, of complex form because of their connection. Different blocks are formed, corresponding to different existing connection standards, more specifically to the existing abutments. In practice, only two different types of connection exist, which greatly limits the choice of the implant abutments and of the implants that can be used by this prior art solution. The latter is therefore very limiting and cannot be implemented on most existing implants. Each dentist must also have a stock of the different existing blocks 20 to select, on a per-case basis, the one that is needed. Also, it is difficult to achieve a great accuracy in the production of the final prosthesis with such an approach, since it is necessary to achieve a theoretically perfect alignment of the outer surface 11 around the preformed opening 22, during the machining of the final prosthesis. In practice, there is always a slight offset, which then complicates the final operation of fixing the prosthesis in the mouth of the patient. Overall, the manufacturing of a prosthesis is complex, lengthy and costly because it requires a first step of manufacturing of a complex block, then a second, distinct step of machining of the complex block, in addition to the logistical operations of referencing, storage and transportation of the complex blocks.

OBJECT OF THE INVENTION

The aim of the present invention is to propose a solution for manufacturing a dental prosthesis on implant which remedies all or some of the drawbacks of the prior art, particularly the drawbacks listed above.

Thus, one object of the invention is to propose a solution for manufacturing a dental prosthesis on implant that is more accurate and less restrictive and more universal.

To this end, the invention relies on a method for manufacturing a dental prosthesis on implant, characterized in that it comprises a step of manufacturing of the outer wall of the dental prosthesis and a step of manufacturing of at least one connection intended for fixing on to at least one implant. These two manufacturing steps are performed in one and the same operation on one and the same manufacturing device.

These steps of manufacturing of the outer wall of the prosthesis and of manufacturing of a connection intended for fixing on to at least one implant are advantageously performed with the same manufacturing device.

Advantageously, the manufacturing of a connection can be done automatically or quasi-automatically on a manufacturing device, suitable for production in a dental practice.

According to one embodiment, the step of manufacturing of a connection with at least one implant of the dental prosthesis comprises the manufacturing of a connection suitable for a direct connection on to an implant, or suitable for a connection with one or more intermediate piece(s), such as a abutment, intended for fixing on to an implant.

The steps of manufacturing of the outer wall of the dental prosthesis and of manufacturing of a connection intended for fixing on to an implant by material removal, for example machining or laser cutting, from a solid block, notably of lithium disilicate, or of feldspathic ceramic, of nano-composite, of zircon, of temporary material such as PMMA, or PEEK, or a metal material.

The method for manufacturing a dental prosthesis can comprise the following preliminary steps:
  determination of the form of the outer wall of the dental prosthesis to be manufactured, by a computer;
  determination of the connection with an implant of the dental prosthesis to be manufactured, by a computer.

The step of determination of the connection with an implant can comprise the following substeps:
  intra-buccal digitization, in the area concerned and/or input through a human-machine interface of data determining the type of implant, and transmission of the digitization or input data to a computer;

selection by a computer of the geometry of the connection suited to said at least one implant concerned from a library stored in an electronic memory.

The method for manufacturing a dental prosthesis can comprise the following additional steps:
reading, in an electronic memory, of data on manufacturing strategies, such as machining strategies;
transmission of manufacturing commands to a manufacturing device.

The method for manufacturing a dental prosthesis can comprise a step of manufacturing of several connections by material removal to manufacture a dental prosthesis intended for fixing on to several implants from a single block.

The steps of manufacturing of the dental prosthesis can be machining steps which use one and the same machining tool or several machining tools, or can be laser cutting or additive manufacturing steps, for the manufacturing steps to be carried out in one and the same operation on the same manufacturing device.

The invention relates also to a device for manufacturing a dental prosthesis on implant, comprising a tool-holder for a tool and a computer, characterized in that the computer transmits drive instructions to the tool-holder of the tool, to manufacture the form of the outer wall of a dental prosthesis and to manufacture at least one connection intended for fixing on to at least one implant, thus implementing a method for manufacturing a dental prosthesis as described previously.

The computer can implement a computer program for determining the form of the outer wall of the dental prosthesis to be manufactured and for determining the connection intended for fixing on to at least one implant or is linked by a communication device with an external computer implementing at least one of these determination steps and transmitting to it the digital data resulting from this determination.

The device for manufacturing a dental prosthesis can comprise a machining tool which is an at least partly conical machining milling cutter, of a length greater than or equal to 17 mm, and comprising an end inscribed in a cylinder with a diameter less than or equal to 1.05 mm.

The device for manufacturing a dental prosthesis can comprise an electronic memory linked to the computer on which is stored a library of connections with implant for a dental prosthesis on implant.

The device for manufacturing a dental prosthesis can comprise a human-machine interface allowing an operator to input an implant model used.

The invention relates also to a dental reconstruction system, characterized in that it comprises an intra-buccal digitization device and a device for manufacturing a dental prosthesis as described previously, and a communication device between the intra-buccal digitization device and the dental manufacturing device.

The invention relates also to a computer-readable computer medium, characterized in that it comprises a stored computer program comprising computer program code means for implementing a method for manufacturing a dental prosthesis on implant, comprising the following steps:
determination, automatic or by input via a human-machine interface, of one or more reference(s) of the implant(s) involved in a dental reconstruction, transmission of this or these data to a computer;
selection by said computer of the geometry of at least one dental prosthesis connection suited to at least one implant of the dental reconstruction zone concerned from a library stored in an electronic memory;
transmission of manufacturing commands for at least one connection of the dental prosthesis to a manufacturing device, to manufacture the at least one connection selected by the preceding steps.

The invention relates also to a method for manufacturing a dental prosthesis on implant, characterized in that it implements the following steps:
determination, automatic or by input via a human-machine interface, of one or more reference(s) of the implant(s) involved in a dental reconstruction, transmission of this or these data to a computer;
selection by said computer of the geometry of at least one connection of a dental prosthesis suited to at least one implant of the dental reconstruction zone concerned from a library stored in an electronic memory;
if appropriate, reading, in an electronic memory, of data on manufacturing strategies, such as machining strategies;
transmission of manufacturing commands for at least one connection of the dental prosthesis to a manufacturing device, to manufacture the at least one connection selected by the preceding steps.

The invention relates also to a device for manufacturing a dental prosthesis on implant, comprising a tool-holder for a tool and a computer, characterized in that the computer transmits drive instructions to the tool-holder to manufacture at least one connection, notably by machining, intended for fixing on to at least one implant, thus implementing a method for manufacturing a dental prosthesis as described above.

BRIEF DESCRIPTION OF THE DRAWINGS

These objects, features and advantages of the present invention will be explained in detail in the following description of a particular embodiment given in a non-limiting manner in relation to the attached figures in which.

DESCRIPTION OF AN EMBODIMENT OF THE INVENTION

Figure 7:
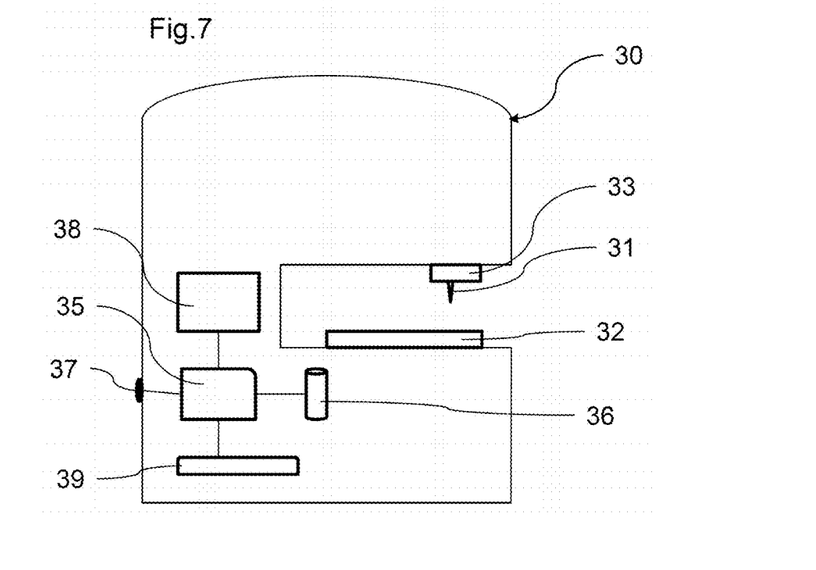
FIG. 7 schematically represents a device for manufacturing a dental prosthesis according to an embodiment of the invention.

The embodiment of the invention relies on a manufacturing device 30, represented by FIG. 7, which comprises a tool-holder 33 provided to receive a machining tool 31, advantageously a machining milling cutter, suitable for machining a block which would be positioned in a housing 32 suited to this purpose. This manufacturing device also comprises a computer 35, for example an on-board computer or any electronic processor, linked to an electronic memory 36 and to a communication device 37 for outside communication, and possibly to a screen 38 and/or a keyboard 39. According to the embodiment, the computer 35 implements a computer program to perform all or some of the steps of the method for manufacturing a dental prosthesis which will be described hereinbelow. This manufacturing device advantageously comprises a driver module and a motorization of the axes with what is often called "brushless" technology, allowing an accuracy of displacement of the machining tool 31 and a stability of the machine guaranteeing a good machining of the small geometrical surfaces.

Figure 8:
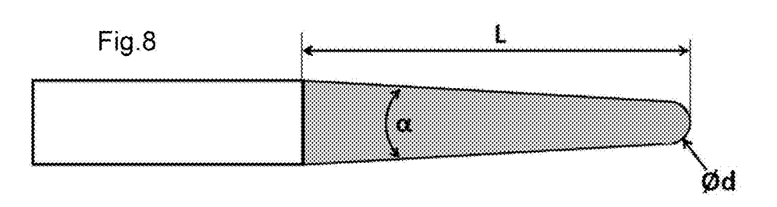
FIG. 8 represents a machining milling cutter used by the manufacturing device according to the embodiment of the invention.

According to an embodiment, a machining tool 31 used by the manufacturing device is represented in FIG. 8. It takes the form of a machining milling cutter, of diamond milling cutter type, which comprises a working zone of a length L greater than or equal to 17 mm, advantageously around 18 mm, of conical form with an angle $\alpha$ less than or equal to 5°, and with an end inscribed in a disc having a diameter d of approximately 1 mm. Its conical form allows it to have a good robustness despite its great working length. The cone of the milling cutter is dimensioned with a small value, which allows it to machine many connections. Its fine point, of a diameter less than or equal to 1.05 mm, also makes it possible to retranscribe the small details of the connections.

Figure 9A:
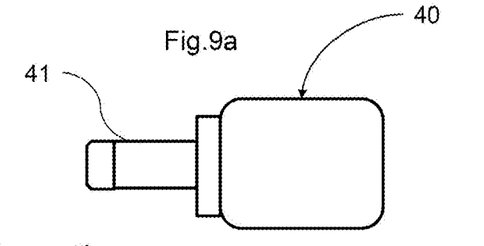
FIGS. 9a and 9b represent solid blocks serving as the basis for a dentist for the machining of dental prostheses according to an embodiment of the invention.
Figure 9B:
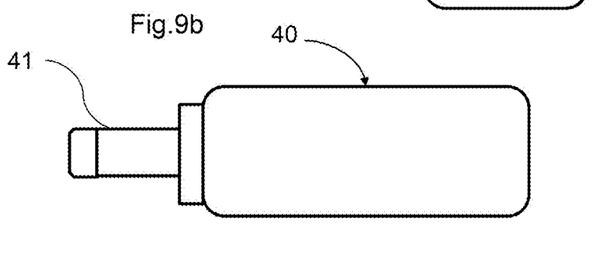

FIG. 9a or 9b illustrates a solid block 40 which serves as a basis for the manufacturing of a prosthesis. This block appears similar to the block 20 of the prior art represented in FIG. 6, with the main difference that it is solid. It does not have any opening or connection. It has a rectangular parallelepipedal form. As a variant, any other basic form could be considered, with a volume greater than the prosthesis which has to be machined, by material removal on said block 40. This form can be cylindrical, spherical, of disc form, etc. A solid block should be understood to mean a block which does not have the connection on implant preformed as in the prior art, or which does not have all the necessary connections. It is preferably solid, that is to say with no opening. Such a block comprises a gripping member 41 which allows it to be held by the manufacturing device while it is being machined. At the end of machining, the gripping member 41 is cut and the surface of the prosthesis at the level of the cut is reworked. The block 40 can be made of different materials, notably including lithium disilicate, feldspathic ceramic, a nano-composite, zircon, a metal material, for example based on titanium or cobalt chrome, a temporary material such as PMMA or PEEK.

When a patient is treated by a dentist for a dental reconstruction based on the positioning of at least one dental implant in his or her jaw, to obtain the result represented in FIG. 1 in the conventional way, the dentist then implements the method for manufacturing the associated dental prosthesis, which comprises, according to the embodiment of the invention, the simultaneous or quasi-simultaneous performance by the same manufacturing device of all of the connections of the dental prosthesis intended to cooperate with the implant and of the peripheral surface of the dental prosthesis, as will be detailed hereinbelow. This approach offers the great benefit of allowing the dentist to manufacture any prosthesis in all circumstances directly in his or her dental practice, to best and most quickly treat any patient, without dependency on a complex and costly stock of blocks as in the prior art solution described previously and without being limited to models of implant and/or of compatible abutments. Note that a connection on implant should be understood to be a surface of particular geometry which allows a mechanical assembly with an implant, either directly or indirectly via one or more intermediate prosthetic components, such as a abutment.

Figure 28:
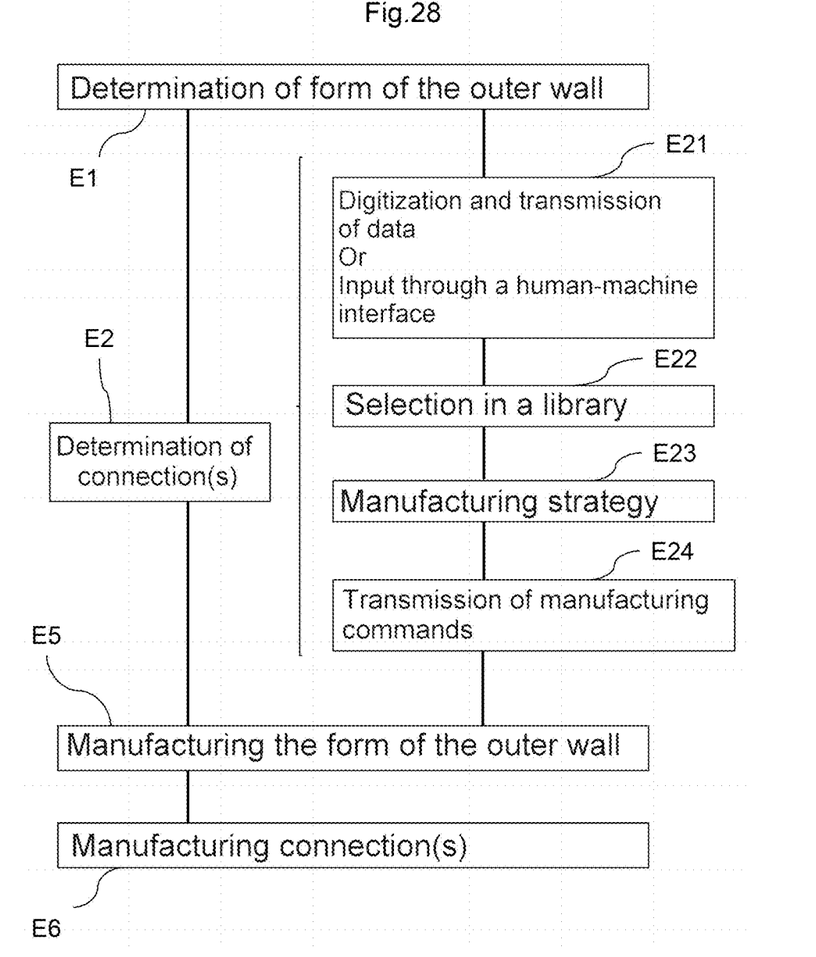
FIG. 28 schematically represents the steps of the method for manufacturing a dental prosthesis according to an embodiment of the invention.

The manufacturing device thus participates in the implementation of a method for manufacturing a dental prosthesis, represented by FIG. 28, which comprises in particular the following steps:
  determination of the form of the outer wall E1 of the prosthesis;
  determination of the connection E2 on implant of the prosthesis;
  from a single standard solid block 40, machining of the form of the outer wall E5 of the prosthesis and machining of all of the connection E6 with implant of the prosthesis.

Advantageously, the two determination steps E1, E2 are performed by the manufacturing device 30, by a computer program run by its computer 35, from data on the mouth of the patient, determining in particular the type of implant used for the dental reconstruction concerned, automatically transmitted to the manufacturing device 30 via its communication device 37 and/or input manually by the dentist via a human-machine interface presented on the screen 38 of the manufacturing device or of a connected external device, possibly using a keyboard 39.

According to an advantageous solution, the same manufacturing device 30 implements the two machining steps E5, E6 mentioned above. These two machining steps are preferably implemented in one and the same machining operation, simultaneously or in succession. A great advantage of the solution stems from the accuracy of the final prosthesis obtained. In effect, the machining of all of the dental prosthesis by the same manufacturing device in one and the same operation, in which the block 40 remains held by its gripping member 41 without discontinuity throughout the operation, makes it possible to achieve a perfect accuracy of the alignment between, on the one hand, the connection on implant of the prosthesis and, on the other hand, the peripheral surface of the tooth, with no loss of position. As a reminder, in the prior art solution, it is very difficult to obtain a good alignment of the peripheral surface to be machined with the preformed connection, which induces offsets.

The step of determination of the connection E2 on implant by the manufacturing method can be wholly or partly automated. It can comprise the following substeps:

E21: digitization of the jaw in the zone to be reconstructed, in particular of the implant(s) involved, transmission of the digitization data to a computer, preferably the computer 35 of the manufacturing device 30, by a communication link between the digitization apparatus used, for example of intra-buccal scanner type, and the communication device 37 of the manufacturing device 30. According to the embodiment, this digitization implements a step of automatic recognition of the implant(s) involved in the reconstruction. As a variant, an operator inputs the reference of the implant or implants involved via a human-machine interface, such that this information is transmitted to a computer which implements this manufacturing method;

E22: selection by the computer 35 of the geometry of the connection suited to at least one implant, preferably each implant, from a library stored in the electronic memory 36, each implant involved being known by the preceding step.

According to a variant embodiment, these two steps are performed by a digitization step that is accurate enough to automatically deduce therefrom the form of the connection, without recourse to a library.

Note that the library of connections stored in the electronic memory 36 makes it possible to predefine the forms of connections suited to the existing implants and abutments, and also compatible with the manufacturing method selected, in this embodiment by the manufacturing device described previously.

Figure 10A:
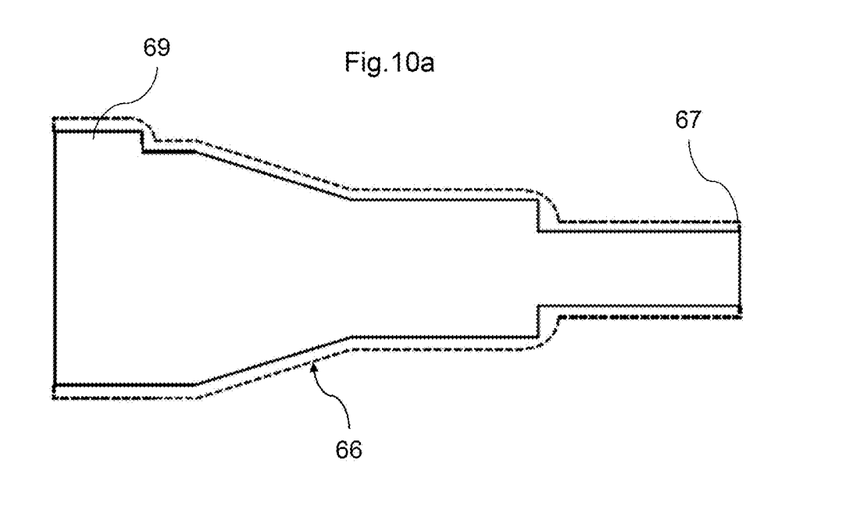
FIGS. 10a and 10b represent the connection of a dental prosthesis after machining of a block by the manufacturing device according to an embodiment of the invention.
Figure 10B:
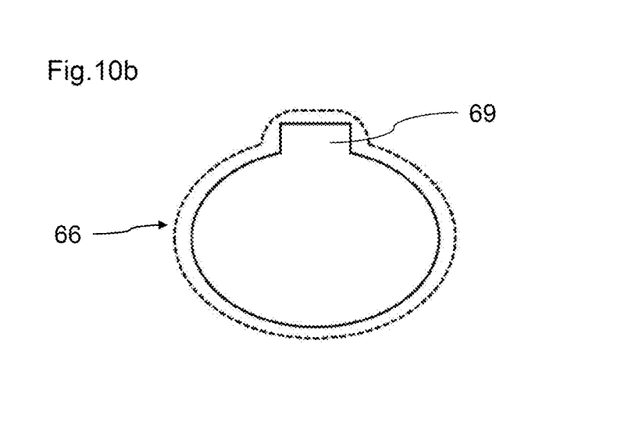

As a non-limiting example, the manufacturing device 30 makes it possible to manufacture a connection of which an exemplary embodiment is represented by FIGS. 10a and 10b. FIG. 10a represents a cross-sectional view of a connection 66 for a dental prosthesis on implant, through a median plane comprising the axis of the prosthesis, intended for an alignment with the axis of the implant. FIG. 10b represents a cross-sectional view of the connection 66 for a dental prosthesis on implant through a plane at right angles to the axis of the dental prosthesis 60, at the level of a polarizing device 69. In the two figures, the solid line form represents a theoretical form, possibly defined by the manufacturer of the implant or of the abutment, whereas the dotted line form corresponds to the form adapted and stored in the library. This adapted form remains compatible with the theoretical form but becomes also compatible with the manufacturing method selected, which comprises, in this embodiment, a machining with a tool such as that described with reference to FIG. 8. Thus, the right angles are for example slightly rounded to allow their production with a milling cutter of small size, in particular the corners of the polarizing device 69. This library also defines plays that are sufficient for the possible insertion of a glue, for example of the order of 60 µm, even 80 µm.

In addition, the manufacturing method then implements a step E23 of determination of a machining strategy to manufacture the connection determined at the end of the preceding step E22. For that, machining strategies are predefined in an electronic memory, which is consulted by the computer responsible for this step of the method. This step thus makes it possible to define as output the commands for driving the tool-holder 33 of the manufacturing device 30, transmitted to the manufacturing device in a command transmission step E24, to automatically engage the manufacturing of the connection of the dental prosthesis.

Figure 29A:
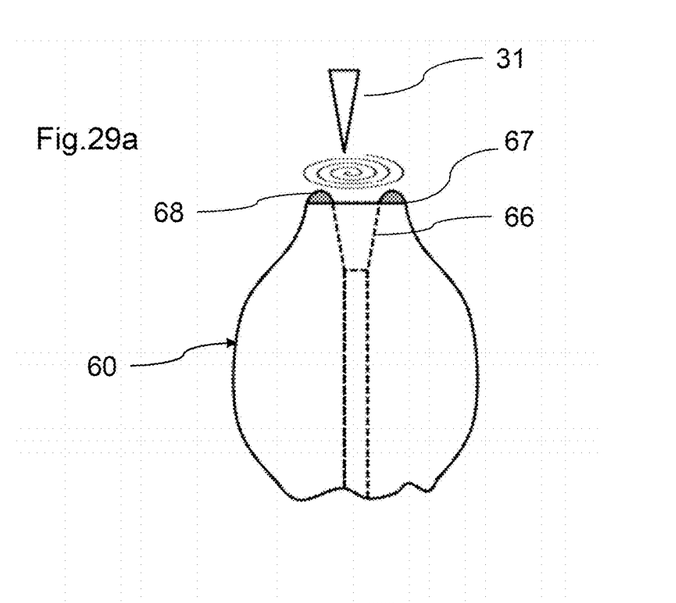
FIGS. 29a and 29b represent a machining strategy implemented according to an embodiment of the invention.
Figure 29B:
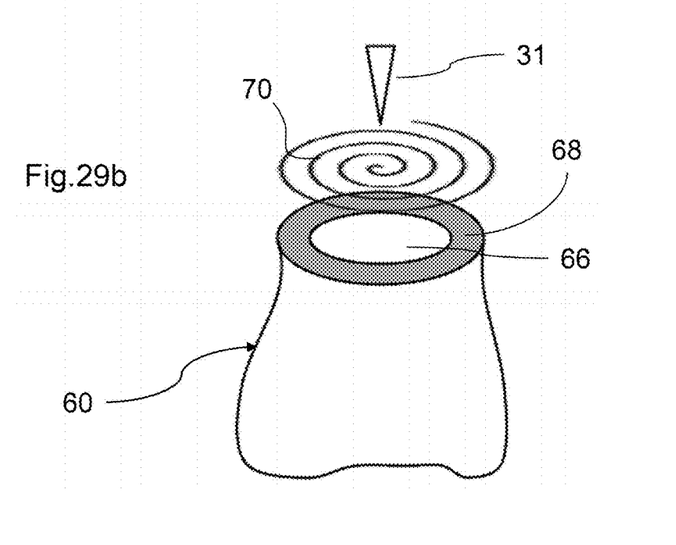

FIGS. 29a and 29b illustrate, by way of example, the data of manufacturing strategy type stored in the electronic memory to form the extreme planar surface 67 of the connection 66 of a dental prosthesis 60. These data define a machining strategy to obtain the planar surface 67 at the end of the connection 66 of the dental prosthesis, using in particular a tool similar to the milling cutter described previously with reference to FIG. 8. This strategy entails the following two machining steps to form this planar surface 67:

initially, temporary manufacturing of this surface by deliberately creating a surplus 68 of material;

secondly, machining of this surplus 68 of material by a spiral trimming along the trajectory 70 represented schematically, at reduced speed, until the planar surface 67 is obtained.

Such an approach thus makes it possible to form the planar surface 67 guaranteeing a bearing surface without microcracks or chips, and of good flatness.

As mentioned above, the step of machining of the connection E6 with implant is implemented by machining instructions transmitted by the computer 35 to the machining tool 31 as a function of the determined connection, and of the predetermined machining strategy.

Note that this approach makes it possible to automate all the method for manufacturing a dental prosthesis, and for example allows a practitioner to simply enter the type of implant(s) used as input for the method, to obtain, as output, the dental prosthesis automatically manufactured, in his or her own practice, without human intervention or the need for the knowledge of a machining expert, with great accuracy and in less time. The method thus allows a patient to leave with his or her dental reconstruction complete and final in a single session with the practitioner. The steps that make it possible to form the outer surface of the prosthesis, best imitating the form of the tooth to be replaced and optimally occupying the available space, are similar to those that exist in the prior art and are not described here.

Figure 11:
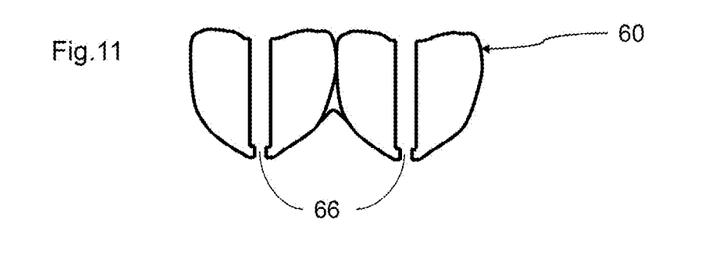
FIG. 11 represents a dental prosthesis of bridge type comprising several connections suitable for connection on several implants according to an embodiment of the invention.

According to another advantageous aspect of the embodiment of the invention, it is possible to easily and accurately manufacture a dental prosthesis intended to replace at least two adjacent teeth, and requiring a fixing on to at least two implants, of bridge type. For that, the manufacturing device 30 and the manufacturing method described previously are used to manufacture, from a single block 40 of larger size, notably of greater length, represented by FIG. 9b, a dental prosthesis comprising several connections for it to be fixed on to several implants and a single and continuous peripheral surface reproducing several teeth. FIG. 11 represents, by way of example, such a prosthesis 60 of bridge type, obtained by a method for manufacturing by removal of material from a block such as that represented by FIG. 9b. The different connections 66 advantageously have mutually parallel axes.

Note that, in such a dental prosthesis on implant with several connections, the spacing and the types of the different connections are unique each time, since they depend on the structure of the zone to be reconstructed. Thus, such a prosthesis with several connections is necessarily customized. For that, such manufacturing was impossible with the prior art described previously, which had to be limited to a single connection preformed for each block.

Note that all or some of the computation steps performed on a computer are advantageously processed by the computer 35 of the manufacturing device 30. However, as a variant, all or some of these computations can be carried out remotely on an external computer, then transmitted to the manufacturing device 30 by a remote communication, preferably automatic, without the intervention of an operator. In effect, this method is preferably carried out in an automated or partially automated manner. Similarly, the library of connections can be remotely sited on an external electronic memory.

This solution allows an integration in to a dental reconstruction method, the manufacturing device 30 belonging to a wider dental reconstruction system.

FIGS. 12 to 21 thus illustrate the steps of a dental reconstruction method according to an embodiment of the invention.

Figure 12:
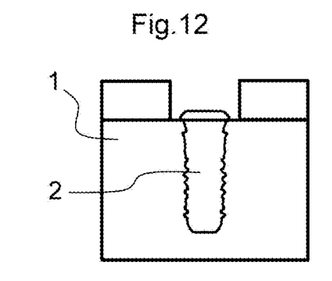
FIGS. 12 to 21 schematically represent the steps of a dental reconstruction method incorporating a method for manufacturing a dental prosthesis according to an embodiment of the invention.

FIG. 12 corresponds to FIG. 1, in which an implant 2 provided with a connection 6 on its outer end has been fixed into a jaw 1.

Figure 13:
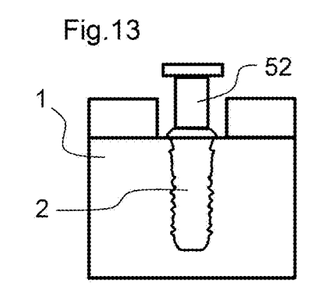
Figure 14:
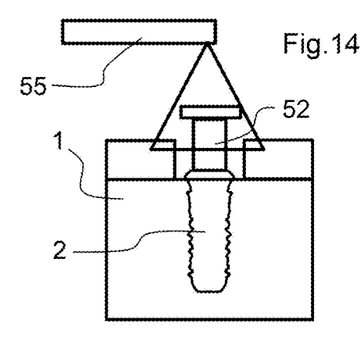
Figure 15:
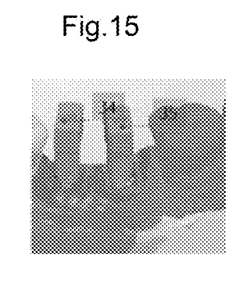

FIG. 13 represents an intermediate step of fixing of a registration element 52 on to the implant 2, commonly referred to as "scan-body", before a digitization step represented by FIG. 14, using a suitable digitization apparatus 55 for digitization in the mouth of a patient, such as an intra-oral scanner. The method then implements a step of transmission of the digitization results to a computer, which reproduces virtually the geometry of the mouth of the patient, as represented by FIG. 15.

Figure 16:
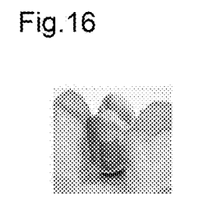
Figure 17:
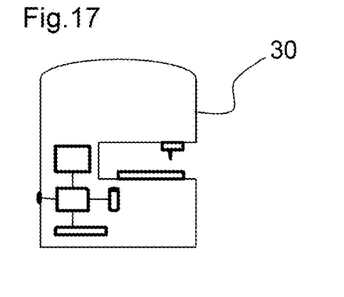

From these data, the computer implements the method for manufacturing a prosthesis, as described previously, then the prosthesis is manufactured by the manufacturing device 30, as represented by FIGS. 16 and 17. As mentioned previously, the digitization step makes it possible to fulfil a first function of definition of the geometry of the outer wall of the dental wall and possibly a second function of automatic recognition of at least one implant involved in the reconstruction.

Figure 18:
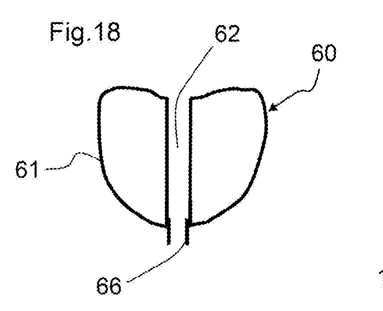

FIG. 18 schematically represents the resulting prosthesis 60, which comprises a peripheral surface 61 best imitating the form of a real tooth pierced by a substantially cylindrical through opening 62, forming, in its lower part, a connection 66.

Figure 19:
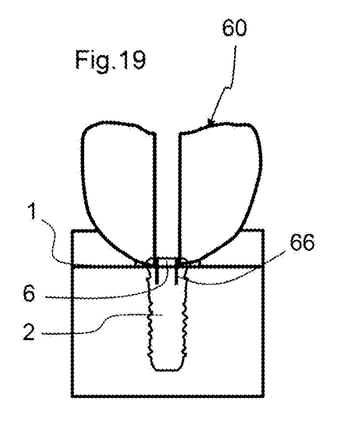
Figure 20:
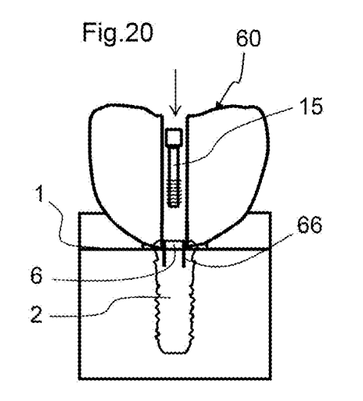

This prosthesis 60 is then directly associated with the implant 2, their respective connections 66, 6 being directly connected to one another, as represented by FIG. 19. These parts have geometries that correspond perfectly since the prosthesis 60 has been manufactured as a function of the implant used. Note that this connection provides a sufficient play for the possible insertion of a glue between the prosthesis and the implant, at the point of their connection. In the representation of the figures, the connection 66 of the prosthesis is of male type, and is inserted into the female connection 6 of the implant. As a variant, this connection 66 could closely match an outer surface of the implant 2. According to another variant, the implant could have a male connection, which would be inserted into a female connection of the dental prosthesis 60.

Figure 21:
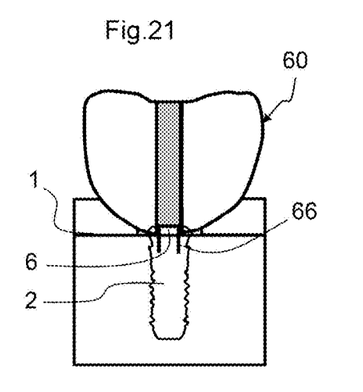

Finally, the association of the prosthesis 60 and of the implant 2 is locked by means of a screw 15 inserted into the through opening 62 of the prosthesis, as represented in FIG. 21, in order to implement a screwing into the implant 2, and the positioning of its head bearing on an abutment formed in the connection 66 of the prosthesis 60. The operation is finalized by the replugging of the prosthesis 60, as represented in FIG. 21.

Note that this reconstruction method has the particular feature of allowing the direct connection of the prosthesis on to an implant, without the need for intermediate components, unlike the prior art solutions. That is in particular possible and efficient by virtue of the increased accuracy of the geometry of the prosthesis manufactured by the embodiment of the invention.

This direct connection method also solves the technical problem of simplifying the existing reconstruction methods.

Thus, as a variant, this method could be implemented with a prosthesis manufactured differently to the manufacturing method described previously, particularly in two distinct machining steps, even produced by two distinct machines.

Naturally, the reconstruction method is not limited to that described above. Thus, as a variant, the prosthesis manufactured according to the embodiment of the invention can naturally be used for the implementation of a dental reconstruction implementing the known principle of use of an intermediate abutment between the implant and the prosthesis. Such a reconstruction method would then comprise initial steps similar to the steps described with reference to FIGS. 12 to 17, then the association of the prosthesis obtained with a abutment 3 to finalize the reconstruction method in a way similar to the prior art described with reference to FIGS. 2 to 5.

Figure 22:
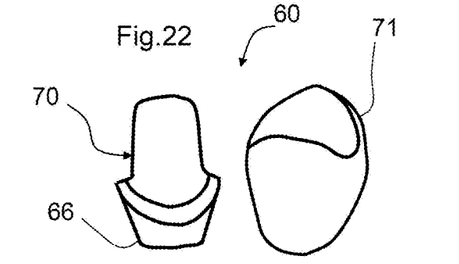
FIGS. 22 to 27 schematically illustrate a variant of the steps of a dental reconstruction method incorporating a method for manufacturing a dental prosthesis of the embodiment of the invention.

FIGS. 22 to 27 illustrate another variant embodiment of the reconstruction method according to the embodiment of the invention. In this variant, the reconstruction method comprises, first of all, initial steps similar to the steps described with reference to FIGS. 12 to 17. In this variant, the prosthesis 60, illustrated in a perspective view from above in FIG. 22, is differentiated from the preceding embodiments in that it takes the form of two distinct parts, a central part called stump or cap 70, and an outer part 71. The cap 70 comprises the connection 66 manufactured according to the steps described previously, while the outer part comprises the peripheral surface imitating the tooth. According to an embodiment, the two parts 70, 71 of the prosthesis 60 are manufactured with the manufacturing device 30 from two distinct blocks.

Figure 23:
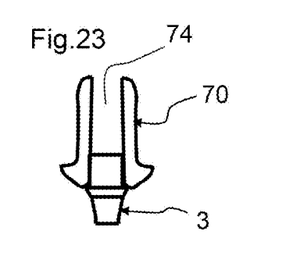
Figure 24:
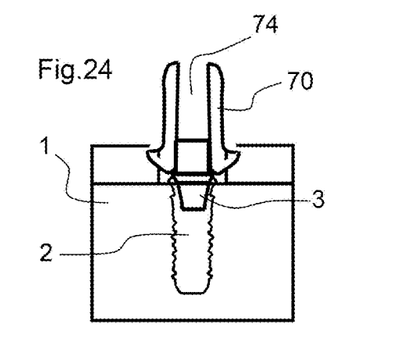
Figure 25:
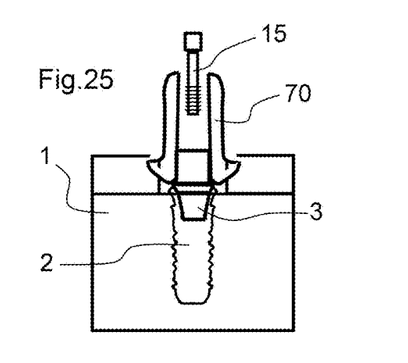
Figure 26:
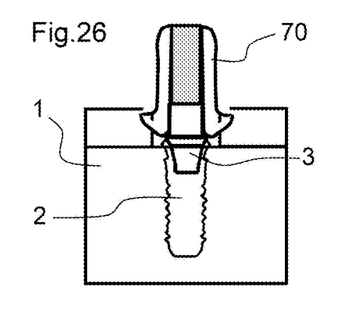
Figure 27:
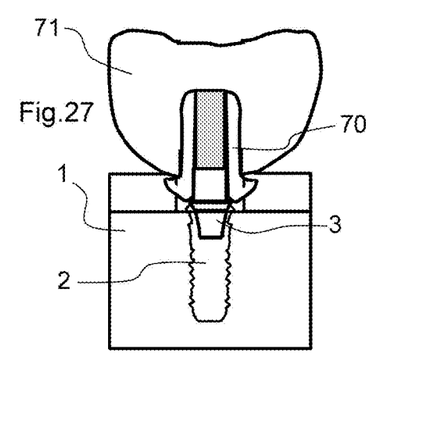

Next, the connection with an implant 2 is obtained via a abutment 3. For that, the cap 70 is then fixed to a abutment 3, as represented by FIG. 23, then the abutment 3 is fixed on to the implant 2, as represented by FIG. 24. This assembly is secured by a screw 15, then the through opening 74 of the cap 70 is plugged, to achieve the result represented by FIG. 26. Finally, the outer part 71 of the prosthesis 60 is fixed on to the cap 70, for example by gluing the surface of its connection on to the outer surface of the cap 70, to achieve the result represented by FIG. 27.

The preceding reconstruction methods have all been described with the use of a screw 15 for locking the fixing on to an implant. As a variant, any other fixing device, mechanical or chemical, by gluing, without screw, could be implemented.

Furthermore, as explained previously, the reconstruction method described above can be implemented in a similar way for the manufacturing and fixing of a bridge, that is to say of a dental prosthesis comprising several connections for a simultaneous fixing on to several implants in order to replace several missing adjacent teeth.

The preceding embodiments have been illustrated by way of non-limiting examples and it is naturally possible to envisage other embodiments, for example by combining the embodiments described. Thus, in all the embodiments described, it is possible to manufacture a dental prosthesis in several parts, for example in two parts forming a stump or cap and a peripheral part, as in the last embodiment. In such a case, the two machining steps can be performed on the same machine, but potentially in two distinct, successive or simultaneous operations. These two steps use two distinct solid blocks, instead of a single block used preferably in the other embodiments described.

The manufacturing device described previously by way of example advantageously allows one and the same manufacturing device to machine with one and the same machining tool, in particular the milling cutter described by way of example with reference to FIG. 8, all of a dental prosthesis on implant, with one or more connection(s). As a variant, the manufacturing device could operate with several distinct machining tools, either arranged in succession on one and the same tool-holder, or used simultaneously because they are fixed on to distinct tool-holders, the device in this last case being equipped with several tool-holders. Thus, two distinct machining tools could be used to respectively manufacture the connection and the outer wall of the prosthesis in a single operation. Thus, each tool could be provided with a distinct form, different from the geometry described in FIG. 8, and specifically suited to the machining step concerned. In such a case, the machining of the connection could be done with a tool that is not conical, for example cylindrical or in the form of a ball. Such an embodiment retains the benefit of being able to produce all of the prosthesis within a dental practice, preferably with a single machine, but, as a variant, using two distinct machines. It also retains the benefit of being able to carry out this manufacturing in an automated and therefore very rapid manner.

Also, according to another embodiment, the method for manufacturing the prosthesis, and the manufacturing device, could operate from one or more tool(s) other than that mentioned by way of example. Thus, the manufacturing device could be of the laser machining type. As a variant, it could be of the 3D printing type, based on laser or similar technology, making it possible to manufacture the prosthesis by additive manufacturing and no longer by removal. Such embodiments would retain the advantage of being able to produce a total dental prosthesis with a single device, preferably in a single operation, and/or from a single starting block. They could also allow an automatic or quasi-automatic implementation, like the other embodiments described. They could be used within a dental practice, to handle a dental reconstruction for a patient in a single operation. Thus, the embodiments described are advantageous in that they comprise a step of manufacturing of the outer wall E5 of the dental prosthesis and a step of manufacturing of all of at least one connection E6 intended for fixing on to at least one implant, this manufacturing being able to be performed by several different techniques. The "machining" terms used previously in the embodiment described in detail can therefore be generalized by the term "manufacturing" to refer to other manufacturing techniques, and thus form other embodiments of the invention.

Also, as emerges from the preceding description, the preceding embodiments all solve a technical problem of simplification, acceleration, and improvement of the manufacturing of a dental prosthesis on implant by the fact that they propose a solution that allows the manufacture of at least one connection suited to a connection on to at least one implant, which can be done automatically or quasi-automatically, and therefore, for example, in a dental practice by a practitioner having no particular skills in machining machines or similar. Thus, the invention relates also to a method for manufacturing a dental prosthesis which implements the following steps:

E21: determination, automatic or by input via a human-machine interface, of one or more reference(s) of the implant(s) involved in a dental reconstruction, transmission of this or these data to a computer which implements this manufacturing method;

E22: selection by said computer of the geometry of the connection suited to each implant from a library stored in the electronic memory;

E23: if appropriate, reading, in an electronic memory, of data on manufacturing strategies, such as machining strategies;

E24: transmission of manufacturing commands to a manufacturing device, which implements the step of manufacturing of the connection(s) E6 of the dental prosthesis.

Next, the method can implement the step of manufacturing of the outer wall E5 of the dental prosthesis, with the same manufacturing device or not, the same tool or not, in one and the same operation.

All the preceding embodiments offer the same benefit of making it possible to manufacture a connection on implant of a dental prosthesis on implant in a dental practice, which provides the versatility and the advantages explained previously. Note that the invention addresses the field of dental prosthesis on implant, direct or indirect, which has the particular feature and technical difficulty of very small dimensions. As a non-limiting example, the reconstruction on implant requires in particular the manufacturing of at least one connection of which at least a terminal part is inscribed within a cylinder with a diameter less than or equal to 7 mm, and even less than or equal to 4 mm, even 3 mm for internal connections that are for example conical or cylindrical. Such a connection comprises an end portion of smaller size than the values mentioned above, closer to a cylinder diameter of 2 mm. Such a connection also comprises complex forms, such as a polarizing device, which can be formed by a protuberance or a hollowed part, which fulfils the function of correct orientation of the prosthesis and the rotational holding function. Thus, the manufacturing of a prosthesis on implant comprises very high demands, and cannot be compared to the manufacturing of a non-implant prosthesis. On the other hand, the manufacturing method and device according to the invention can naturally also be used to manufacture non-implant prostheses.

The invention relates also to a device for manufacturing a dental prosthesis on implant, which implements one of the manufacturing methods described previously.

Finally, as was explained previously, the invention relies on a computer program for generating manufacturing commands for a dental prosthesis, this program being able to be run on any computer, incorporated in the manufacturing device or external and linked remotely to this device. Thus, the invention relies also on a computer medium that can be read by a management unit, or by said computer, characterized in that it comprises a stored computer program comprising computer program code means for implementing the method for manufacturing a dental prosthesis on implant as explained previously. Such a computer program can comprise the steps E21 to E24 explained above.

The invention claimed is:

1. A method for manufacturing a dental prosthesis on implant, comprising:
   manufacturing an outer wall of a dental prosthesis from a solid block of material, and
   manufacturing at least one connection intended for fixing onto at least one implant of the dental prosthesis,
   wherein the manufacturing of the dental prosthesis and the manufacturing of the at least one connection are performed machining using a same manufacturing device, and
   wherein a geometry of the at least one connection suited to the at least one implant being selected from a library stored in an electronic memory.

2. The method according to claim 1, wherein the manufacturing of the at least one connection with the at least one implant of the dental prosthesis comprises manufacturing the at least one connection suitable for a direct connection onto the at least one implant, or for the at least one connection with at least one intermediate piece intended for fixing onto the at least one implant.

3. The method according to claim 1, wherein the manufacturing of the outer wall of the dental prosthesis and the manufacturing of the at least one connection intended for fixing onto the implant of the dental prosthesis comprise material removal.

4. The method according to claim 1, comprising:
determining a form of the outer wall of the dental prosthesis to be manufactured;
determining a total connection with the implant of the dental prosthesis to be manufactured
wherein the determining the form of the outer wall of the dental prosthesis to be manufactured and the determining the total connection with the implant of the dental prosthesis to be manufactured are performed by a computer.

5. The method according to claim 4, wherein the determining of the at least one connection with the implant comprises:
performing an intra-buccal digitization in an area concerned and/or performing input through a human-machine interface of data determining a type of implant, and transmitting the digitization or input data to the computer;
selecting, by the computer, of the geometry of the at least one connection suited to the at least one implant concerned from the library stored in the electronic memory.

6. The method according to claim 5, comprising:
reading, in an electronic memory, of data on manufacturing strategies;
transmitting manufacturing commands to the manufacturing device.

7. The method according to claim 1, comprising manufacturing several of the at least one connection by material removal to manufacture a plurality of dental prosthesis intended for fixing onto several implants from a single block.

8. A device for manufacturing a dental prosthesis on implant, comprising:
a tool-holder for a tool, and
a computer,
wherein the computer transmits drive instructions to the tool-holder of the tool to manufacture a form of an outer wall of a dental prosthesis from a solid block, and to manufacture at least one connection intended for fixing onto at least one implant, wherein the computer is configured to implement a method for manufacturing a dental prosthesis on the implant, comprising:
manufacturing the outer wall of a dental prosthesis from the solid block, and
manufacturing at least one connection intended for fixing onto at least one implant of the dental prosthesis,
wherein the manufacturing of the dental prosthesis and the manufacturing of the at least one connection performed (i) in a same operation and (ii) using a same machining tool and (iii) using a same manufacturing device, and
wherein a geometry of the at least one connection suited to the at least one implant being selected from a library stored in an electronic memory.

9. The device for manufacturing the dental prosthesis according to claim 8, comprising a computer medium comprising a stored computer program comprising computer program code configured for implementing a method for manufacturing a dental prosthesis on implant so that, when the programme code is executed on a computer,
the computer implements a method for determining a form of an outer wall of a dental prosthesis to be manufactured and for determining at least one connection intended for fixing onto at least one implant,
wherein the computer implements the determining actions, or the computer is linked by a communication device to an external computer implementing at least one of the determining actions and transmitting to the computer digital data resulting from the at least one of the determining actions by the external computer.

10. The device according to claim 8, comprising a machining tool which is an at least partly conical machining milling cutter, of a length greater than or equal to 17 mm, and having an end inscribed in a cylinder with a diameter less than or equal to 1.05 mm.

11. The device according to claim 8, comprising the electronic memory linked to the computer, wherein the library of connections with implant for the dental prosthesis on implant is stored in the electronic memory.

12. The device according to claim 8, comprising a human-machine interface allowing an operator to input an implant model used.

13. A dental reconstruction system, comprising:
an intra-buccal digitization device,
a device for manufacturing a dental prosthesis according to claim 8, and
a communication device between the intra-buccal digitization device and the dental manufacturing device.

14. The method according to claim 3, wherein the material removal is by at least one of machining and laser cutting, from the solid block of material.

15. The method according to claim 14, wherein the material of the solid block is selected from the group consisting of lithium disilicate, feldspathic ceramic, nano-composites, zircon, temporary materials, and metals.

16. The method according to claim 15, wherein the material of the solid block is selected from temporary materials, wherein the temporary materials are PMMA and PEEK.

17. The method according to claim 1, wherein the manufacturing of the dental prosthesis and the manufacturing of the at least one connection are performed using the same manufacturing device includes controlling the manufacturing device with a same computer, and wherein the computer performs said selection of the geometry of the at least one connection suited to the at least one implant from the library stored in the electronic memory.

18. The method according to claim 1, wherein said library contains a plurality of pre-defined forms of connections for connecting a bottom of the dental prosthesis directly or indirectly to at least one implant below the bottom of the dental prosthesis.

19. The method according to claim 1, wherein said at least one connection is configured to connect a bottom of the dental prosthesis directly or indirectly to at least one implant below the bottom of the dental prosthesis.

20. The method according to claim 19, wherein said library contains a plurality of pre-defined forms of connections for connecting a bottom of the dental prosthesis directly or indirectly to at least one implant below the bottom of the dental prosthesis.

21. The method according to claim 1, wherein said manufacturing at least one connection includes removing material from said solid block of material to form a through opening extending through the dental prosthesis that is configured to receive a screw for locking the dental prosthesis to an implant.

* * * * *